(12) United States Patent
Schein

(10) Patent No.: US 9,502,948 B2
(45) Date of Patent: Nov. 22, 2016

(54) METHOD FOR PRODUCING STATOR POLE TEETH THAT ARE WOUND AND CONNECTED TO ONE ANOTHER

(71) Applicant: Uwe Schein, Kaufungen (DE)

(72) Inventor: Uwe Schein, Kaufungen (DE)

(73) Assignee: Continental Automotive GmbH, Hannover (DE)

( * ) Notice: Subject to any disclaimer, the term of this patent is extended or adjusted under 35 U.S.C. 154(b) by 265 days.

(21) Appl. No.: 14/366,213

(22) PCT Filed: Dec. 18, 2012

(86) PCT No.: PCT/EP2012/075929
§ 371 (c)(1),
(2) Date: Jun. 17, 2014

(87) PCT Pub. No.: WO2013/092575
PCT Pub. Date: Jun. 27, 2013

(65) Prior Publication Data
US 2014/0360007 A1    Dec. 11, 2014

(30) Foreign Application Priority Data
Dec. 20, 2011    (DE) .................. 10 2011 089 238

(51) Int. Cl.
*H02K 15/00* (2006.01)
*H02K 15/02* (2006.01)
*H02K 15/095* (2006.01)

(52) U.S. Cl.
CPC .......... *H02K 15/022* (2013.01); *H02K 15/095* (2013.01); *Y10T 29/49009* (2015.01); *Y10T 29/53143* (2015.01)

(58) Field of Classification Search
CPC .................. Y10T 29/49009; Y10T 29/53143; Y10T 29/49073; Y10T 29/5353; H02K 3/28
(Continued)

(56) References Cited

U.S. PATENT DOCUMENTS

| 4,340,186 A | 7/1982 | Shimada et al. |
| 6,362,553 B1 * | 3/2002 | Nakahara ................. H02K 1/14 310/216.004 |

(Continued)

FOREIGN PATENT DOCUMENTS

| CN | 1379529 | 11/2002 |
| DE | 29 47 976 | 6/1980 |

(Continued)

OTHER PUBLICATIONS

Bala et al. "Handbuch der Wickeltechnik elektrischer Maschinen", 1976, pp. 304-305 and 316-317.
(Continued)

*Primary Examiner* — Thiem Phan
(74) *Attorney, Agent, or Firm* — Cozen O'Connor

(57) ABSTRACT

A method for producing stator pole teeth includes: arranging stator pole teeth to be wound in the form of a row, each of the stator pole teeth having at least one insulation body; winding one pole tooth or several pole teeth of the row of stator pole teeth; routing winding wire or winding wires out of a winding space in the pole teeth to the outside of the stator pole teeth into a laying space bounded on one side by insulation bodies of the pole teeth; and laying the winding wire or the winding wires in the laying space to connect individual pole teeth to one another. During laying of the winding wire or wires, the laying space is temporarily
(Continued)

constricted such that the winding wires are forcibly automatically axially stacked in the laying space so as to avoid wire crossovers.

7 Claims, 2 Drawing Sheets

(58) Field of Classification Search
USPC ....... 29/596, 598, 602.1, 605, 606; 310/179, 310/184, 198, 208, 216.004
See application file for complete search history.

(56) References Cited

U.S. PATENT DOCUMENTS

| | | | | |
|---|---|---|---|---|
| 7,135,799 | B2* | 11/2006 | Rittmeyer | H02K 3/28 |
| | | | | 310/179 |
| 8,288,903 | B2* | 10/2012 | Matsuda | H02K 1/148 |
| | | | | 310/43 |
| 2007/0182265 | A1 | 8/2007 | Makino et al. | |

FOREIGN PATENT DOCUMENTS

| | | |
|---|---|---|
| DE | 199 07 973 | 9/1999 |
| DE | 10 2004 042 737 | 3/2006 |
| EP | 2 372 878 A2 | 10/2011 |
| EP | 2 388 887 | 11/2011 |
| JP | 09-322494 | 12/1997 |
| JP | 2000 217315 A | 8/2000 |
| JP | 2002-325385 | 11/2002 |
| JP | 2003 061320 A | 2/2003 |
| JP | 2005-176531 | 6/2005 |
| JP | 2011-234562 | 11/2011 |
| WO | WO 2009/106273 A2 | 9/2009 |
| WO | WO 2011/052936 A2 | 5/2011 |

OTHER PUBLICATIONS

Tzseheutsehler, "Technologic des Elektromasehinenbaus", 1990, p. 306.

* cited by examiner

METHOD FOR PRODUCING STATOR POLE TEETH THAT ARE WOUND AND CONNECTED TO ONE ANOTHER

CROSS-REFERENCE TO RELATED APPLICATIONS

This is a U.S. national stage of application No. PCT/EP2012/075929, filed on 18 Dec. 2012, which claims priority to the German Application No. 10 2011 089 238.9, filed 20 Dec. 2011, the content of both incorporated herein by reference.

BACKGROUND OF THE INVENTION

1. Field of the Invention

The present invention relates to a method for producing stator pole teeth that are wound and connected to one another that includes arranging the pole teeth that are to be wound in the form of a row; winding one pole tooth or several pole teeth of the row; routing the winding wire or the winding wires out of the winding space of the pole teeth to the outside of the pole teeth into a laying space bounded on one side by insulation bodies of the pole teeth; and laying the winding wire or the winding wires in the laying space in order to connect individual pole teeth to one another.

2. Related Art

When producing stators, the individual stator pole teeth have to be wound and, after winding, have to be connected to one another by connecting the winding wires of individual pole teeth. In this process, it is known to arrange the individual pole teeth in a row and to wind the winding space of the pole teeth, which winding space is bounded by insulation bodies, with wire, wherein a multiple-needle technique is preferably used, in which a plurality of pole teeth are simultaneously wound with in each case one needle. After the individual pole teeth, that is to say the corresponding laminated core between the insulation bodies of the pole teeth, are wound, the wires are routed out of the winding space of the pole teeth and laid outside the winding spaces, in order to connect corresponding pole teeth to one another. In this case, the first and third pole teeth, the second and fourth pole teeth etc. of the row are connected by way of example.

It is important here to achieve a parallel wire profile without the individual laying wires crossing, in order to avoid increasing the size of the outside diameter of the pole tooth row. However, an increase in the size of the diameter of this kind was previously accepted. Up until now it has been assumed, on account of the varying axial heights of the wire entry and exit positions on the winding body, that achieving a parallel wire profile without crossings is not possible without an additional geometry on the winding body, this requiring an extreme amount of installation space.

SUMMARY OF THE INVENTION

An object of the invention is to provide a method by which stator pole teeth can be wound and connected in a particularly reliable and installation space-saving manner.

According to an aspect of the invention, this object is achieved in the case of a method of the specified type in that, during laying of the winding wire or the winding wires, the laying space is temporarily constricted such that the winding wires are forcibly automatically axially stacked in the laying space so as to avoid wire crossovers.

The invention proceeds from the basic idea of constricting the laying space available to the winding wire or the winding wires, and as a result forcibly axially stacking the wires, and preventing wire crossovers during laying of the winding wire or of the winding wires on the outside for the purpose of connecting the individual pole teeth. The wire is automatically forced into its laying position by virtue of the laying space being temporarily constricted during laying of the wire or of the wires, wherein a plurality of wires are stacked or arranged one above the other parallel in relation to one another in the axial position. In this case, "axial" is understood to mean that the wires are arranged one above the other in the direction of the longitudinal axis of the stator or pole tooth through the laying space constriction.

Therefore, according to an aspect of the invention, the wire is forced into its intended position in the winding process during connection between the individual poles, wherein wire crossings are prevented and the individual laying wires are stacked. The installation space is reduced in this way since the laying wires or connecting wires are arranged (stacked) one above the other.

In the method according to an aspect of the invention, the laying space is only temporarily constricted during laying of the wire or of the wires, so that routing of the wire out of the winding space of the pole teeth and/or insertion of the wire into the winding space is not impeded by the constriction of the laying space. If, for example, a pole tooth is completely wound, the wire is routed through the insulation body to the outside into the laying space. The laying space is then temporarily constricted, so that the wires are axially stacked. Once this takes place, the laying space is again widened in order to not impede further method steps. In this case, the laying space is constricted at points at which a wire is laid (connection between individual poles).

In the method according to an aspect of the invention, the laying space is preferably constricted by the movement of bounding slides which bound the laying space on the other side. As mentioned, the laying space is bounded by the insulation bodies of the pole teeth of the row on one side. The side of the laying space situated opposite the insulation bodies is varied by the bounding slides, so that a physically bounded and temporally limited space constriction can be carried out in this way. In this case, the bounding slides are moved forward and backward in a variable manner independently of one another. In this case, a bounding slide is preferably associated with each pole tooth of the row, so that the laying space of each pole tooth can be varied, that is to say constricted or widened.

As mentioned, the method according to the invention is used, in particular, when a multiple-needle technique is employed, in which a plurality of pole teeth of a row are simultaneously wound using a plurality of needles and are simultaneously laid and, respectively, connected. Specifically in a method of this kind, it is important that laying wires or connecting wires are supported or are stacked one above the other such that there are no wire crossings.

The invention further relates to a device for producing stator pole teeth that are wound and connected to one another, comprising a receiving device for supporting the pole teeth that are to be wound in the form of a row, and comprising a needle device for winding the pole teeth and for laying the winding wires between pole teeth in a laying space.

According to one aspect, this device is characterized in that it has a device for temporarily constricting the laying space of the winding wire.

This automatically axially stacks the winding wires in the laying space, and wire crossovers are avoided.

The device for temporarily constricting the laying space preferably comprises a large number of movement slides, wherein, in particular, a movement slide is associated with each pole tooth of the row. In this case, the movement slides can be moved forward and backward in a variable manner independently of one another, so that the width of the laying space of each pole tooth can be varied in a temporally limited and physically bounded manner. The laying space for the wire is constricted, and a plurality of laying wires, which are located in this space, are arranged or stacked one above the other, by sliding the bounding slides in the direction of the insulation body of the associated pole tooth.

BRIEF DESCRIPTION OF THE DRAWINGS

The invention will be explained in detail below with reference to an exemplary embodiment in connection with the drawings, in which.

DETAILED DESCRIPTION OF THE PRESENTLY PREFERRED EMBODIMENTS

Figure 1:
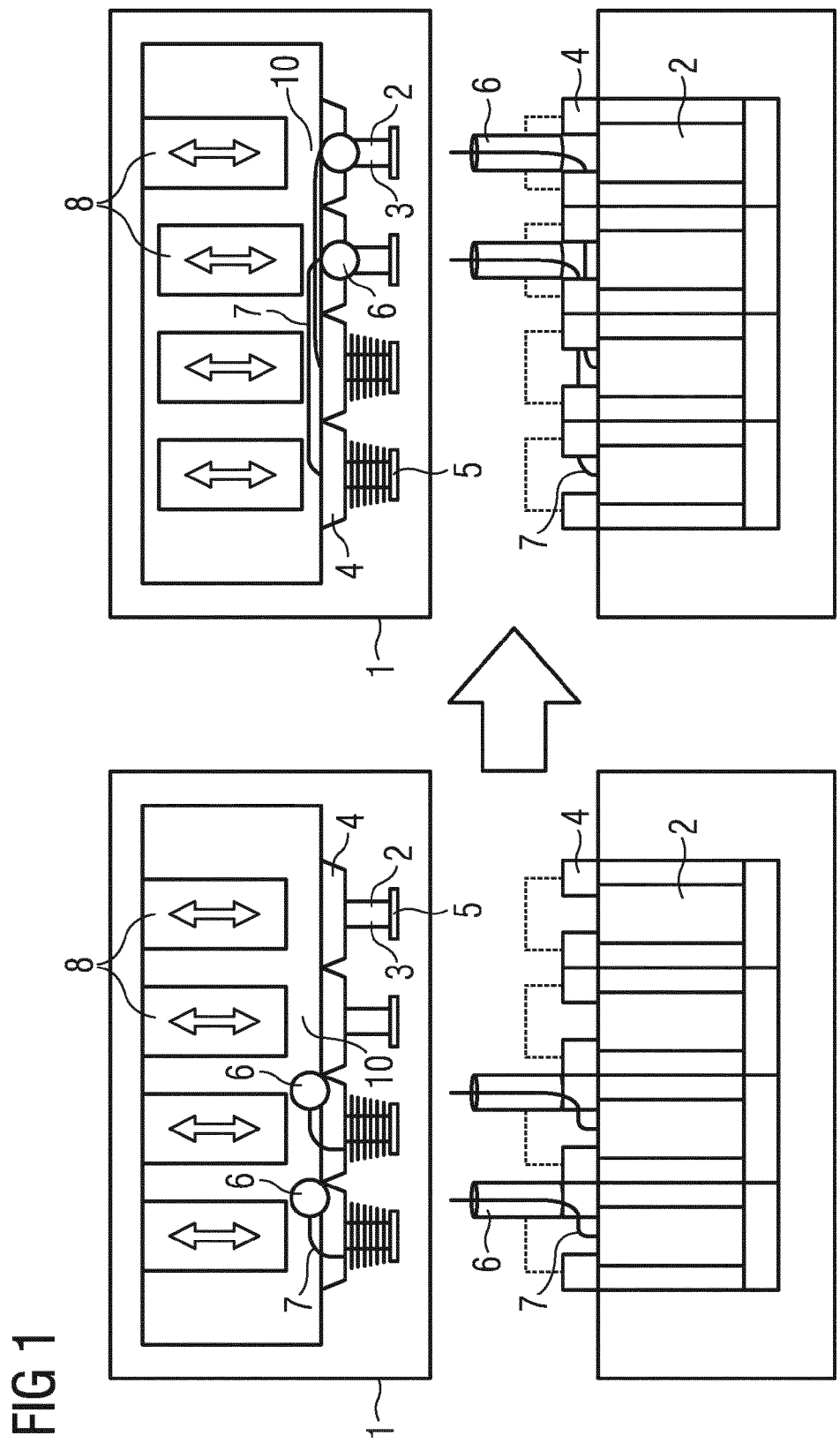
FIG. 1 shows two schematic plan views and front views of a device for producing stator pole teeth that are wound and connected to one another.

The device illustrated in the figures has a pole tooth receptacle 1 in which four pole teeth 2 are arranged in a row for winding and connection purposes. The pole teeth 2 each have two insulation bodies 4, 5, and a winding space 3 arranged between the insulation bodies. In the images in FIG. 1, the two pole teeth on the left-hand side are illustrated in the wound state, while the two pole teeth on the right-hand side have not yet been wound.

The pole teeth are wound by a multiple-needle technique in which, in the present case, two pole teeth are simultaneously wound using a needle or winding nozzle 6 in each case.

The two illustrations on the left-hand side of FIG. 1 show the device after completion of the winding process of the two pole teeth on the left-hand side in a state in which the two winding wires 7 have been routed through the insulation body 4, out of the winding space 3 of the respective pole tooth, into a laying space. The respective winding wire ends are now connected between the individual pole teeth, wherein the winding wires 7 are laid in the laying space and are again routed through the insulation bodies 4 into the winding spaces 3 of the next pole teeth 2. In this case, the first pole tooth from the left is connected to the third pole tooth from the left, and the second pole tooth from the left is connected to the fourth pole tooth from the left.

The images on the right-hand side of FIG. 1 show the state during laying and, respectively, connection. The available laying space 10 is bounded on one side by the respective insulation bodies 4 of the pole teeth 2, while the opposite boundary is formed by bounding slides 8, of which one slide 8 is associated with one pole tooth 2 in each case. The bounding slides 8 are temporarily moved in the direction of the insulation bodies 4 during laying of the wires 7, so that the laying space 10 is constricted in this region. As a result, the laying wires are arranged (stacked) one above the other, so that the laying wires do not cross over. In the images on the right-hand side of FIG. 1, the three bounding slides 8 on the left-hand side have all been moved in the direction of the insulation bodies 4 of the pole teeth 2, so that a constricted laying space 10 is produced, while the bounding slide 8 on the right-hand side is illustrated in its starting position in which the laying space 10 is not constricted. In this position, the winding wire can, for example, again be inserted through the insulation body 4 into the winding space 3. In this case, the third slide 8 from the left is located in a position in which the winding wire 7 has been inserted specifically into the laying space 10 and constriction of the laying space 10 has started.

Figure 2:
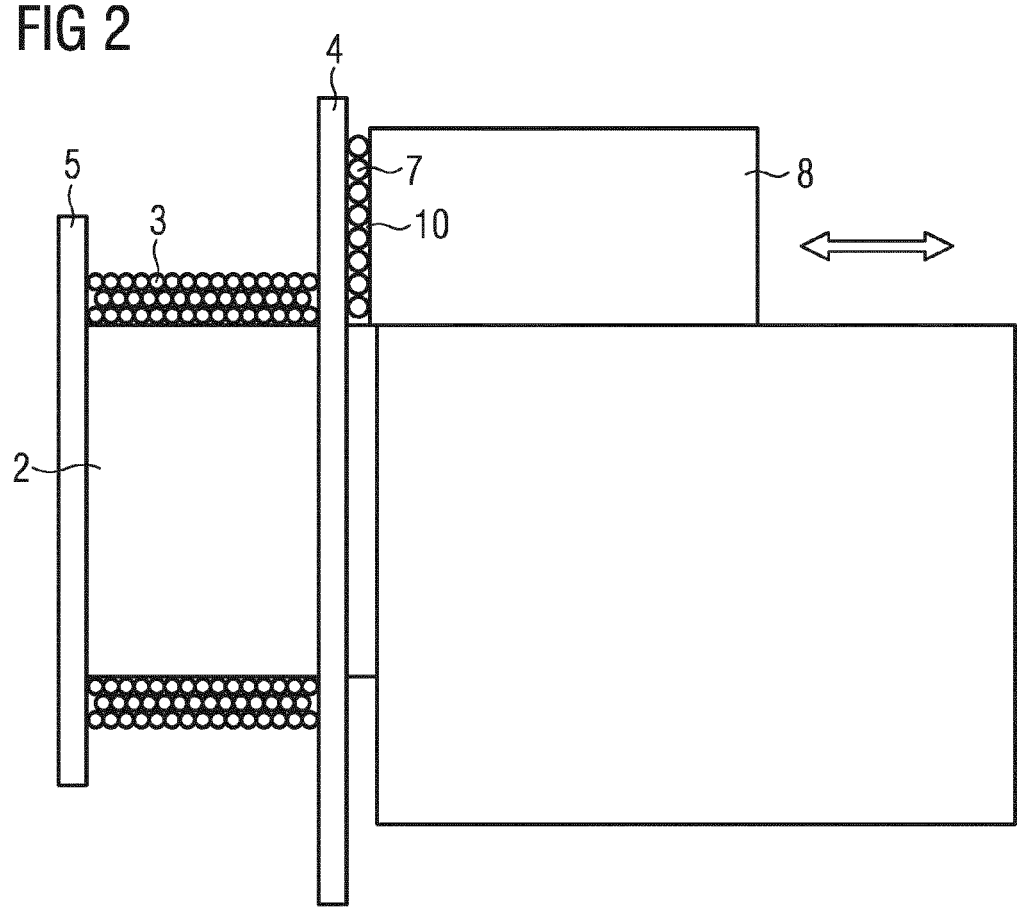
FIG. 2 shows a schematic side view of the device of FIG. 1.

FIG. 2 shows the device in an enlarged side view. The figure shows a pole tooth 2 with two insulation bodies 4, 5. A laying space 10 for laying the winding wire 7 on the outside is illustrated in the state constricted by a bounding slide 8, so that the corresponding winding wires 7, which are to be laid for connection purposes, are arranged one above the other and no intersecting laying wires are produced in this way.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for producing stator pole teeth that are wound and connected to one another, comprising:
   arranging stator pole teeth to be wound in the form of a row, each of the stator pole teeth having at least one insulation body;
   winding one pole tooth or several pole teeth of the row of stator pole teeth;
   routing winding wire or winding wires out of a winding space in the pole teeth to the outside of the stator pole teeth into a laying space bounded on one side by insulation bodies of the pole teeth; and
   laying the winding wire or the winding wires in the laying space to connect individual pole teeth to one another,
   wherein, during laying of the winding wire or of the winding wires, the laying space is temporarily constricted such that the winding wires are forcibly automatically axially stacked in the laying space so as to avoid wire crossovers.

2. The method as claimed in claim 1, wherein the laying space is constricted by moving bounding slides which bound the laying space on a side opposite the insulation bodies.

3. The method as claimed in claim 2, wherein the bounding slides are moved forward and backward in a variable manner independently of one another.

4. The method as claimed in claim 1, wherein a plurality of the pole teeth of the row are simultaneously wound using several needles and are simultaneously laid.

5. The method as claimed in claim 1, further comprising:
   supporting, by a receiving device, the pole teeth that are to be wound in the form of a row, wherein the winding of the pole teeth and laying of the winding wires in the laying space is done by a needle device, and wherein the temporary constriction of the laying space (10) of the winding wires (7) is done by a constricting device.

6. The method as claimed in claim 5, wherein the constricting device comprises a plurality of bounding slides (8).

7. The method as claimed in claim 6, wherein each of the plurality of bounding slides (8) is associated with a respective one pole tooth (2) of the row.

* * * * *